(12) United States Patent
Qiu

(10) Patent No.: US 11,363,327 B2
(45) Date of Patent: Jun. 14, 2022

(54) METHOD FOR DISPLAYING VIRTUAL ITEM, TERMINAL AND STORAGE MEDIUM

(71) Applicant: BEIJING DAJIA INTERNET INFORMATION TECHNOLOGY CO., LTD., Beijing (CN)

(72) Inventor: Weisen Qiu, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 0 days.

(21) Appl. No.: 16/875,605

(22) Filed: May 15, 2020

(65) Prior Publication Data

US 2020/0280759 A1    Sep. 3, 2020

(30) Foreign Application Priority Data

May 16, 2019   (CN) .......................... 201910411491.1

(51) Int. Cl.
| | |
|---|---|
| H04N 7/16 | (2011.01) |
| H04N 21/431 | (2011.01) |
| G06Q 30/06 | (2012.01) |
| H04N 21/2187 | (2011.01) |
| H04N 21/2543 | (2011.01) |
| H04N 21/485 | (2011.01) |

(52) U.S. Cl.
CPC ..... *H04N 21/4312* (2013.01); *G06Q 30/0621* (2013.01); *G06Q 30/0643* (2013.01); *H04N 21/2187* (2013.01); *H04N 21/2543* (2013.01); *H04N 21/4858* (2013.01)

(58) Field of Classification Search
CPC .......... H04N 21/2187; H04N 21/2543; H04N 21/8146
USPC ............................................................ 725/1
See application file for complete search history.

(56) References Cited

U.S. PATENT DOCUMENTS

| 2016/0180425 A1 | 6/2016 | Normann et al. |
| 2018/0204270 A1* | 7/2018 | Cheng ................ G06Q 30/0641 |
| 2019/0201789 A1* | 7/2019 | Yang ..................... G06F 3/0482 |

FOREIGN PATENT DOCUMENTS

| CN | 106851426 A | 6/2017 |
| CN | 107396197 A | 11/2017 |
| CN | 107820132 A | 3/2018 |

* cited by examiner

*Primary Examiner* — Jivka A Rabovianski
(74) *Attorney, Agent, or Firm* — Meunier Carlin & Curfman LLC

(57) ABSTRACT

The present disclosure relates to a method for displaying a virtual item, a terminal and a storage medium. The method includes: receiving an instruction for customizing a virtual item; displaying a window on the live broadcast interface in response to the instruction; acquiring a custom content through the window input by the first user, wherein the custom content is configured to define a form of the virtual item; generating the virtual item based on the custom content; and displaying the virtual item on the live broadcast interface.

19 Claims, 6 Drawing Sheets

METHOD FOR DISPLAYING VIRTUAL ITEM, TERMINAL AND STORAGE MEDIUM

CROSS REFERENCE TO RELATED APPLICATIONS

This application claims priority to and benefit of Chinese Patent Application No. 201910411491.1, filed on May 16, 2019, which is hereby incorporated by reference in its entirety.

FIELD

The present disclosure relates to the technical field of networks and in particular to a method for displaying a virtual item, a terminal and a storage medium.

BACKGROUND

With the development of the network technology, webcast has become an emerging entertainment way and has been concerned by more and more users. In a live broadcast scene, an anchor user may perform live broadcast in a live broadcast room, and an audience user may interact with the anchor user in the live broadcast room. For example, the audience user may present a virtual item to the anchor user, and the virtual item may be displayed on an interface of the live broadcast room.

In the related art, when wanting to present the virtual item to the anchor user, the audience user in the live broadcast room may select one virtual item from various virtual items provided on the interface of the live broadcast room, and present the selected virtual item to the anchor user. The terminal is triggered to add the virtual item on a corresponding position of the interface for displaying.

In the above-mentioned art, the audience user selects one virtual item from the virtual items provided on the interface and presents the virtual item to the anchor user, and the virtual items provided on the interface are constant to result in monotonous display effects of the virtual items.

SUMMARY

The present disclosure provides a method for displaying a virtual item, a terminal and a storage medium so as to overcome the problem of a monotonous display effect.

In some embodiments, a method for displaying a virtual item is provided and applied to a first terminal through which a first user watches a live broadcast interface of a second user. The method includes:

receiving an instruction for customizing a virtual item;

displaying a window on the live broadcast interface in response to the instruction;

acquiring a custom content through the window input by the first user, wherein the custom content is configured to define a form of the virtual item;

generating the virtual item based on the custom content; and displaying the virtual item on the live broadcast interface.

In some embodiments, the custom content comprises a text or graphics, and said generating the virtual item includes:

taking the text or graphics as the virtual item; or beautifying the text or graphics to generate the virtual item.

In some embodiments, the custom content comprises description of the virtual item, the description includes key information and non-key information, and the key information is configured to define an overall form of the virtual item, and said generating the virtual item includes:

determining a first virtual item from a plurality of preset virtual items based on the key information; and regulating the first virtual item to generate a second virtual item.

In some embodiments, said regulating the first virtual item includes:

regulating the first virtual item based on the non-key information to generate the second virtual item; or regulating the first virtual item in a regulation operation on the first virtual item to generate the second virtual item.

In some embodiments, the non-key information is configured to define a partial form of the virtual item, and said regulating the first virtual item based on the non-key information to generate the second virtual item includes:

regulating a part of the first virtual item based on the non-key information to generate the second virtual item, wherein a form of the part in the second virtual item conforms to the partial form defined by the non-key information.

In some embodiments, the custom content comprises a picture obtained by shooting a material object, and said generating the virtual item includes:

extracting features of the material object in the picture;

determining a third virtual item from a plurality of preset virtual items based on the features of the material object, wherein a similarity between the third virtual item and the material object is greater than a first similarity threshold; and regulating the third virtual item to generate a fourth virtual item, wherein a similarity between the fourth virtual item and the material object is greater than a second similarity threshold, and the second similarity threshold is greater than the first similarity threshold.

In some embodiments, said regulating the third virtual item includes:

regulating the third virtual item based on the features of the material object to generate the fourth virtual item; or regulating the third virtual item in a regulation operation on the third virtual item to generate the fourth virtual item.

In some embodiments, the method further includes:

displaying an input window for inputting a numerical value of the virtual item;

displaying a payment window for paying the numerical value when acquiring the numerical value; and displaying the virtual item on the live broadcast interface based on that payment is completed.

In some embodiments, the method further includes:

transmitting a request for presenting the virtual item to a server, wherein the server is configured to transmit information for displaying the virtual item to terminals, wherein the terminals are used by users in a live broadcast room of the second user.

In some embodiments, the method further includes:

displaying an information input window, wherein the information input window is configured to acquire descriptive information of the virtual item, and the descriptive information is described by the first user.

In some embodiments, the method further includes:

transmitting the descriptive information to a server, wherein the server is configured to transmit the descriptive information to terminals, wherein the terminals are used by users in a live broadcast room of the second user.

In some embodiments, the method further includes:

displaying the descriptive information while displaying the virtual item on the live broadcast interface.

In some embodiments, the method further includes:

receiving scoring information, wherein the scoring information is configured to evaluate ability of the first user to customize the virtual item; and displaying the scoring information on the live broadcast interface.

In some embodiments, a method for displaying a virtual item is provided, and applied to a second terminal through which a second user performs live broadcast. The method includes:

displaying a live broadcast interface on the second terminal;

receiving information for displaying a virtual item, wherein the virtual item is presented to the second user by a first user, the virtual item is generated based on a custom content of the first user, and the custom content is configured to define a form of the virtual item; and displaying the virtual item on the live broadcast interface.

In some embodiments, the method further includes:

receiving descriptive information of the virtual item described by the first user; and displaying the descriptive information while displaying the virtual item on the live broadcast interface.

In some embodiments, the method further includes:

displaying a target window while displaying the virtual item on the live broadcast interface, wherein the target window is configured to input descriptive information of the virtual item described by the second user; and displaying result information after acquiring the descriptive information input to the target window, wherein the result information is configured to indicate whether the input descriptive information is same as descriptive information of the virtual item described by the first user.

In some embodiments, the method further includes:

acquiring scoring information, wherein the scoring information is configured to evaluate ability of the first user to customize the virtual item; and transmitting the scoring information to a server, wherein the server is configured to transmit the scoring information to terminals, and the terminals are used by users in a live broadcast room of the second user.

In some embodiments, the method further includes:

displaying the scoring information on the live broadcast interface.

In some embodiments, a terminal is provided, and includes:

one or more processors;

one or more memories configured to store instructions executable by the one or more processors;

wherein the one or more processors are configured to execute the instructions to implement the method for displaying a virtual item described above.

In some embodiments, a non-volatile computer readable storage medium storing instructions is provided. The instructions stored in the non-volatile computer readable storage medium are executed by a processor of an electronic equipment to implement the method for displaying a virtual item described above.

In some embodiments, the live broadcast interface of the second user is displaying on the first terminal of the first user. The first user may intend to present a customized virtual item to the second user and send an instruction for customizing the virtual item. The first terminal displays a window when receiving the instruction. The first user can input custom content to the window. The first terminal generates the virtual item based on the custom content, and display the virtual item on the live broadcast interface Due to the adoption of the above-mentioned technical solution, an audience user may customize a virtual item for an anchor user, the demand that the audience user customizes the virtual item may be met, more abundant expression manners are provided for the audience user, the virtual item customized by the audience user may be displayed on the live broadcast interface, and the display effect of the virtual item may be enriched.

It should be understood that the above general description and detailed description hereafter are merely exemplary and explanatory, but cannot limit the present disclosure.

BRIEF DESCRIPTION OF THE DRAWINGS

Accompanying drawings herein are incorporated into the specification, construct one part of the specification, show embodiments conforming to the present disclosure and explain the principle of the present disclosure together with the specification.

DETAILED DESCRIPTION OF THE EMBODIMENTS

Exemplary embodiments will be described in detail herein, and examples of the exemplary embodiments are shown in the accompanying drawings. When the following descriptions relate to the accompanying drawings, unless indicated otherwise, same numerals in the different accompanying drawings indicate same or similar elements. Implementation ways described in the following exemplary embodiments do not represent for all implementation ways consistent with the present disclosure, and oppositely, are only examples of devices and methods consistent with some aspects of the present disclosure in detail described in the appended claims.

Figure 1:
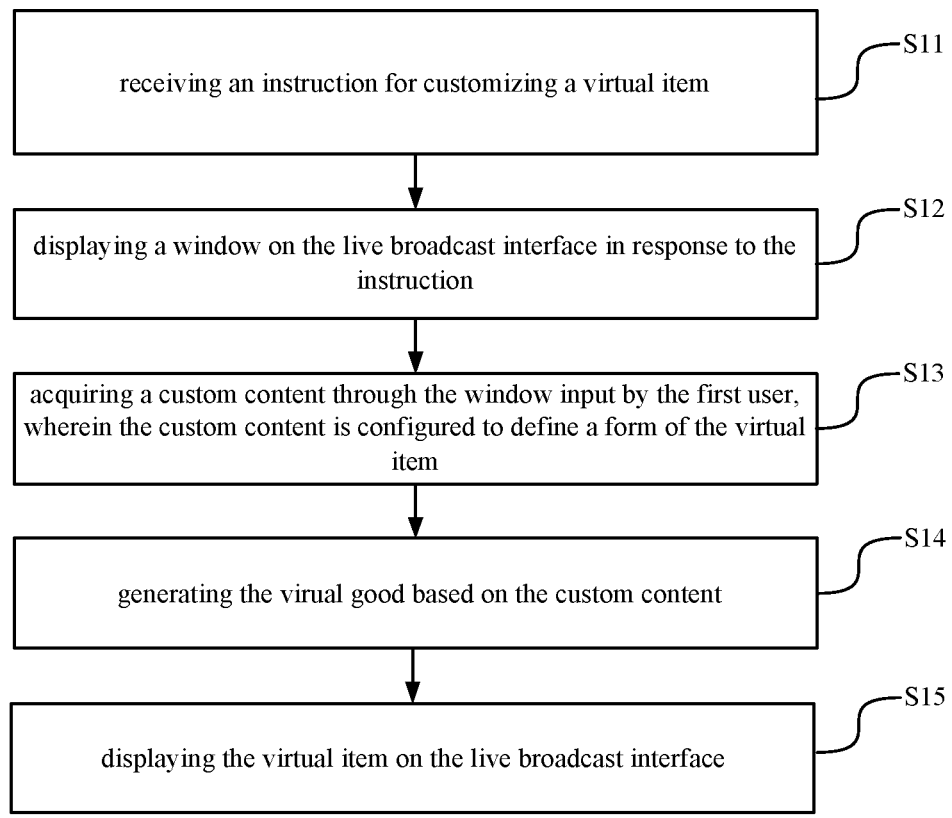
FIG. 1 is a flow diagram of a method for displaying a virtual item shown according to an exemplary embodiment.

FIG. 1 is a flow diagram of a method for displaying a virtual item shown according to an exemplary embodiment. As shown in FIG. 1, the method for displaying a virtual item is applied to a first terminal, a first user watches a live broadcast interface of a second user through the first terminal, and the method includes the following operations:

S11 receiving an instruction for customizing a virtual item;

S12 displaying a window on the live broadcast interface in response to the instruction;

S13 acquiring a custom content through the window input by the first user, wherein the custom content is configured to define a form of the virtual item;

S14 generating the virtual item based on the custom content; and

S15 displaying the virtual item on the live broadcast interface.

In some embodiments, the live broadcast interface of the second user is displayed on the first terminal of the first user. The first user may intend to present a customized virtual item to the second user and send an instruction for customizing the virtual item. The first terminal displays a window when receiving the instruction. The first user can input custom content to the window. The first terminal generates the virtual item based on the custom content, and display the virtual item on the live broadcast interface. Due to the adoption of the above-mentioned technical solution, an audience user may customize a virtual item for an anchor user, the demand that the audience user customizes the virtual item may be met, more abundant expression manners are provided for the audience user, the virtual item customized by the audience user may be displayed on the live broadcast interface, and the display effect of the virtual item may be enriched.

In some embodiments, the custom content includes a text or graphics, and the text or graphics is token as the virtual item; or the text or graphics is beautified to generate the virtual item.

In some embodiments, the custom content includes description of the virtual item, the description includes key information and non-key information, and the key information is configured to define an overall form of the virtual item, and a first virtual item is determined from a plurality of preset virtual items based on the key information; and the first virtual item is regulated to generate a second virtual item.

In some embodiments, the first virtual item is regulated based on the non-key information to generate the second virtual item; or the first virtual item is regulated in a regulation operation on the first virtual item to generate the second virtual item.

In some embodiments, the non-key information is configured to define a partial form of the virtual item, and a part of in the first virtual item is regulated based on the non-key information to generate the second virtual item, wherein a form of the part in the second virtual item conforms to the partial form defined by the non-key information.

In some embodiments, the custom content includes a picture obtained by shooting a material object, and features of the material object in the picture are extracted;

a third virtual item is determined from a plurality of preset virtual items based on the features of the material object, the similarity between the third virtual item and the material object is greater than a first similarity threshold; and the third virtual item is regulated to generate a fourth virtual item, the similarity between the fourth virtual item and the material object is greater than a second similarity threshold, and the second similarity threshold is greater than the first similarity threshold.

The higher the matching degree between features of a virtual item and features of a material object, the greater the similarity between the virtual item and the material object.

In some embodiments, the third virtual item is regulated based on the features of the material object to generate the fourth virtual item; or the third virtual item is regulated in a regulation operation on the third virtual item to generate the fourth virtual item.

In some embodiments, the method further includes:

displaying an input window for inputting a numerical value of the virtual item;

displaying a payment window for paying the numerical value when acquiring the numerical value; and displaying the virtual item on the live broadcast interface based on that payment is completed.

In some embodiments, the method further includes:

transmitting a request for presenting the virtual item to a server, wherein the server is configured to transmit information for displaying the virtual item to terminals, wherein the terminals are used by users in a live broadcast room of the second user.

In some embodiments, the method further includes:

displaying an information input window, wherein the information input window is configured to acquire descriptive information of the virtual item, and the descriptive information is described by the first user.

In some embodiments, the method further includes:

transmitting the descriptive information to a server, wherein the server is configured to transmit the descriptive information to terminals, wherein the terminals are used by users in a live broadcast room of the second user.

In some embodiments, the method further includes:

displaying the descriptive information while displaying the virtual item on the live broadcast interface.

In some embodiments, the method further includes that:

receiving scoring information, wherein the scoring information is configured to evaluate ability of the first user to customize the virtual item; and displaying the scoring information on the live broadcast interface.

Figure 2:
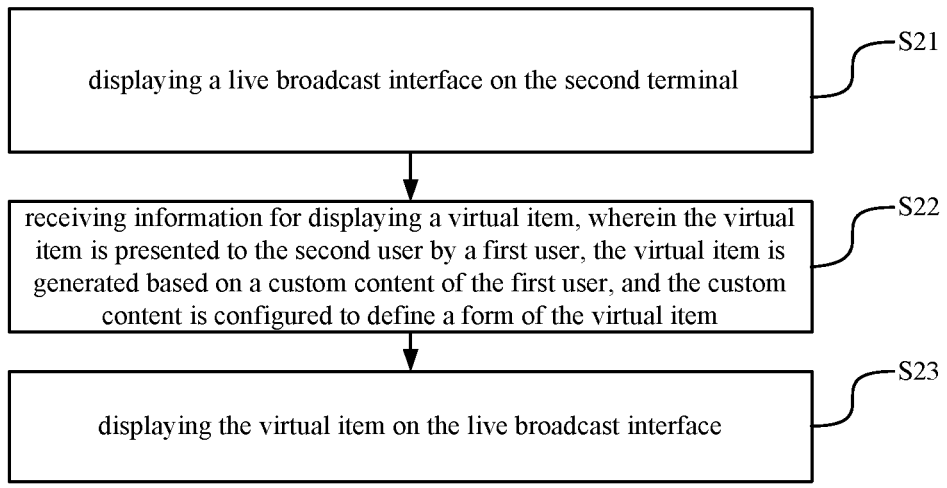
FIG. 2 is a flow diagram of a method for displaying a virtual item shown according to an exemplary embodiment.

FIG. 2 is a flow diagram of a method for displaying a virtual item shown according to an exemplary embodiment. As shown in FIG. 2, the method for displaying a virtual item is applied to a second terminal, a second user performs live broadcast through the second terminal, and the method includes following operations:

S21 displaying a live broadcast interface on the second terminal;

S22 receiving information for displaying a virtual item, wherein the virtual item is presented to the second user by a first user, the virtual item is generated based on a custom content of the first user, and the custom content is configured to define a form of the virtual item; and S23 displaying the virtual item on the live broadcast interface.

In some embodiments, the live broadcast interface of the second user is displayed on the second terminal of the second user. The virtual item customized by the first user is displayed on the live broadcast interface when the information for displaying the virtual item is received. The virtual item is generated based on the custom content of the first user. Due to the adoption of the above-mentioned technical solution, an audience user may customize a virtual item for an anchor user, the demand that the audience user customizes the virtual item may be met, more abundant expression manners are provided for the audience user, the virtual item customized by the audience user may be displayed on the live broadcast interface, and the display effect of the virtual item may be enriched.

In some embodiments, the method further includes:

receiving descriptive information of the virtual item described by the first user; and displaying the descriptive information while displaying the virtual item on the live broadcast interface.

In some embodiments, the method further includes:

displaying a target window while displaying the virtual item on the live broadcast interface, wherein the target window is configured to input descriptive information of the virtual item described by the second user; and displaying result information after acquiring the descriptive information input to the target window, wherein the result information is configured to indicate whether the input descriptive information is same as descriptive information of the virtual item described by the first user.

In some embodiments, the method further includes:

acquiring scoring information, wherein the scoring information is configured to evaluate ability of the first user to customize the virtual item; and transmitting the scoring information to a server, wherein the server is configured to transmit the scoring information to terminals, and the terminals are used by users in a live broadcast room of the second user.

In some embodiments, the method further includes:

displaying the scoring information on the live broadcast interface.

The above-mentioned possible implementations may be optionally combined to form optional embodiments of the present disclosure, which will not be described herein.

Figure 3:
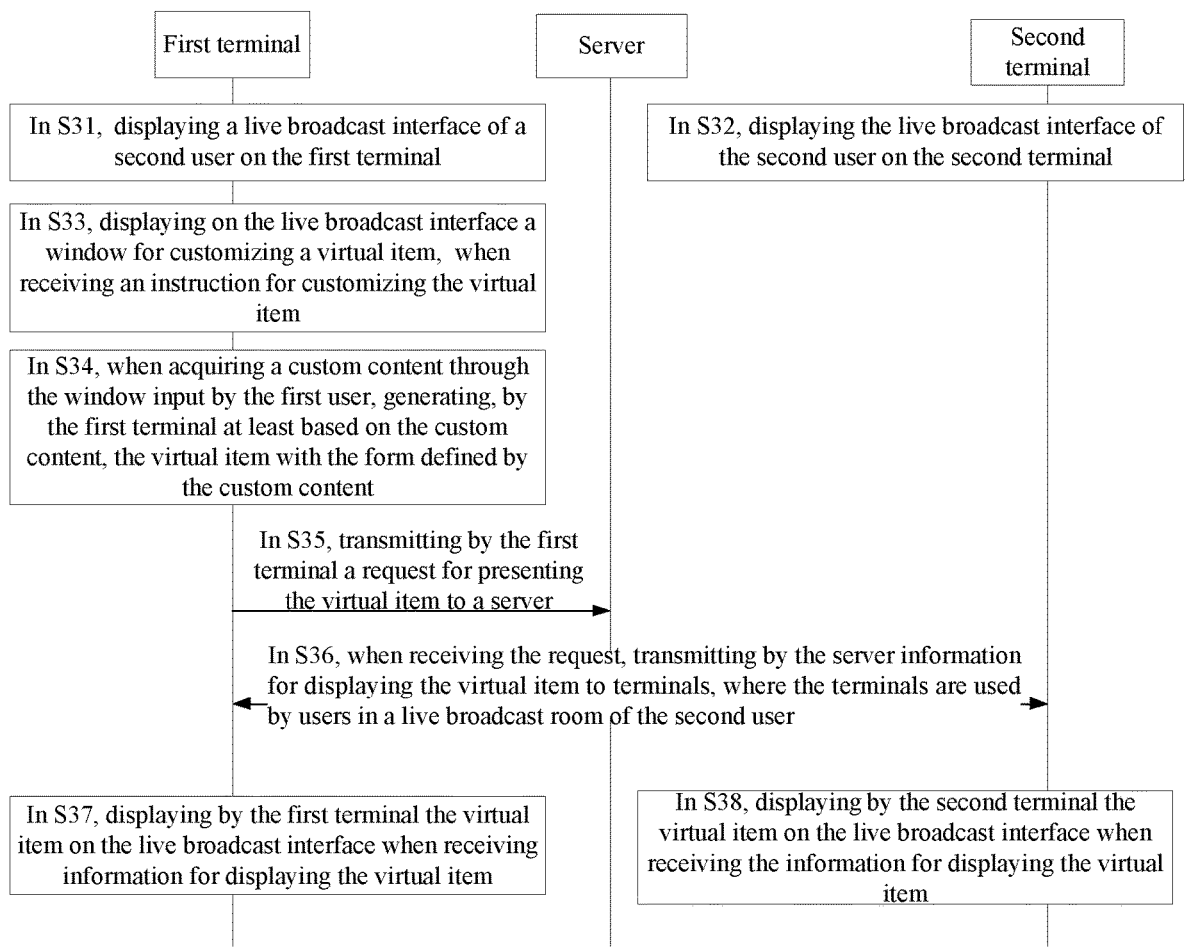
FIG. 3 is a flow diagram of a method for displaying a virtual item shown according to an exemplary embodiment.

FIG. 3 is a flow diagram of a method for displaying a virtual item shown according to an exemplary embodiment. As shown in FIG. 3, the method includes following operations S31-S38.

In S31, a live broadcast interface of a second user is displayed on a first terminal, and a first user watches the live broadcast interface of the second user through the first terminal.

The second user is an anchor user and may perform live broadcast based on a live broadcast application installed on the second terminal, and the first user is an audience user in a live broadcast room of the second user and may watch the live broadcast based on a live broadcast application installed on the first terminal.

In some embodiments, when the first user wants to watch a live video of the second user, corresponding operations may be performed on the first terminal. In some embodiments, the live broadcast room of the second user is clicked to trigger the first terminal to display the live broadcast interface of the second user. In a live broadcast process of the second user, the second terminal may acquire video frames and audio frames generated during the live broadcast of the second user, generates a live broadcast stream based on the acquired video frames and audio frames, and transmits the live broadcast stream to a server. The server may transmit the live broadcast stream to respective terminals. The terminals are used by users in the live broadcast room of the second user. When the first terminal receives the live broadcast stream, the live video of the second user may be played on the live broadcast interface based on the live broadcast stream.

In S32, the live broadcast interface of the second user is displayed on the second terminal, and the second user performs live broadcast through the second terminal.

In some embodiments, if the second user wants to perform live broadcast, corresponding operations may be performed on the second terminal. In some embodiments, a live broadcast starting button is clicked to trigger the second terminal to display the live broadcast interface of the second user. In a live broadcast process of the second user, the second terminal may play the live video of the second user on the live broadcast interface based on the live broadcast stream of the second user.

In S33, a window for customizing a virtual item is displayed on the live broadcast interface of the first terminal when an instruction for customizing the virtual item is received.

The instruction for customizing the virtual item is configured for the first user to customize the virtual item.

In some embodiments, the instruction for customizing the virtual item may be triggered by a user operation. In some embodiments, an option for customizing a virtual item may be displayed on the live broadcast interface, and the first user may perform clicking operation on the option to trigger the instruction for customizing the virtual item.

A paintbrush option may be provided in the window for customizing the virtual item, and the first user may select the paintbrush option and control a mouse to input a custom content in the window. In order to improve the customization efficiency of the first user, the window for customizing the virtual item may also be provided with various texts, graphics and colors to be selected by the first user, so that a user may rapidly input the custom content. The window for customizing the virtual item may be further provided with an import option, and the first user may import a picture based on the import option.

In S34, when the custom content input to the window for customizing the virtual item is acquired, the first terminal generates a virtual item corresponding to the custom content based on the custom content. The custom content is configured to define a form of a virtual item to be generated.

In some embodiments, the first user may perform graffiti in the window for customizing the virtual item. In other words, any kind of custom content is randomly input in the window for customizing the virtual item, and after the input is completed, the first terminal may acquire the custom content input by the first user, and thus, a customized virtual item can be generated.

In some embodiments, the custom content may be a text or graphics. Accordingly, the text or graphics may be token as the virtual item; or, the text or graphics is beautified to generate the virtual item. A user inputs a content with any one form to trigger a terminal to generate a virtual item based on the content, so that the demand that the user customizes the virtual item may be met.

The custom content may be the text or graphics and may also be a combination of the text and graphics. The first terminal may directly take the custom content input by the first user as a virtual item customized by the first user, or the custom content input by the first user is beautified to generate a virtual item customized by a user. Beautification may be any one processing way, such as addition of a filter or specific effects, capable of achieving a beautifying effect.

The custom content of the user directly serves as the virtual item customized by the user, so that the virtual item is more in line with the real intention of the user; and the custom content of the audience user is automatically beautified to generate the virtual item, so that the virtual item is more beautiful and is more likely to be popular to the anchor user.

In some embodiments, the custom content may be description of the virtual item, the description includes key information and non-key information, and the key information is configured to define an overall form of the virtual item. Accordingly, a first virtual item may be determined from a plurality of preset virtual items based on the key information; and the first virtual item is regulated to generate a second virtual item. The user input the description to trigger the terminal to generate the virtual item according to the description, so that not only is the demand that the user customizes the virtual item met, but also the efficiency that the user customizes the virtual item is improved.

The key information may be a name of the virtual item, the non-key information may be an adjective for the virtual item. In some embodiments, if the description is "spectacled cat", the key information is "cat", and the non-key information is "spectacled". The plurality of preset virtual items may be virtual items provided by a live broadcast platform and may be provided with respective description. After acquiring the description input by the user, the first terminal may determine the virtual item from the plurality of preset virtual items according to the key information of the description, and take the virtual item as the first virtual item.

The first virtual item is determined according to the key information in the description input by the user and is only a virtual item approximately meeting the demand of the user. The first terminal may further regulate the first virtual item so as to generate a virtual item more meeting the demand of the user. In some embodiments, the first virtual item is regulated based on the non-key information in the description to generate the second virtual item; or the first virtual item is regulated in a regulation operation of the first virtual item to generate the second virtual item.

The non-key information is configured to define the partial form of the virtual item, and a part of the first virtual item is regulated based on the non-key information to generate the second virtual item, where a form of the part in the second virtual item conforms to the partial form defined by the non-key information.

The first terminal may automatically regulate the first virtual item based on the non-key information. In some embodiments, if the first virtual item is "cat" and the non-key information is "spectacled", the part corresponding to the non-key information is eyes of the cat, and therefore, spectacles may be worn on the eyes of the cat. Through an automatic regulation way, the operation of the user may be saved. The user may also regulate the first virtual item on the first terminal so that the first virtual item is regulated to be in a form required by the user. By providing the automatic regulation way and a manual regulation way of the user, the flexibility is improved.

In some embodiments, the custom content may be a picture obtained by shooting a material object. Accordingly, features of the material object in the picture may be extracted; a third virtual item is determined from the plurality of preset virtual items according to the features of the material object, the similarity between the third virtual item and the material object is greater than a first similarity threshold; and the third virtual item is regulated to generate a fourth virtual item, the similarity between the fourth virtual item and the material object is greater than a second similarity threshold, and the second similarity threshold is greater than the first similarity threshold. The user inputs the picture of the material object to trigger the terminal to generate a virtual item with greater similarity to the material object, so that the demand that the user customizes the virtual item may be met; and the form of the material object does not need to be drawn by the user, so that the efficiency that the user customizes the virtual item may be improved.

If the user wants to generate a virtual item with a form of a material object in a real scene, the user may shoot the material object to obtain a picture of the material object and then import the picture into the window for customizing the virtual item. The first terminal may extract features of the material object in the picture by adopting a feature extraction algorithm. For the plurality of preset virtual items, the first terminal may also extract features of the plurality of preset virtual items and compare the features of the material object with the features of the plurality of preset virtual items. The higher the matching degree between features of a virtual item and features of a material object, the greater the similarity between the virtual item and the material object. A virtual item having greater similarity to the material object is determined from the plurality of preset virtual items and is taken as the third virtual item. The terminal may further regulate the third virtual item in consideration of a certain difference possibly existing between the third virtual item and the material object, so that a virtual item that the user wants and that has greater similarity to the material object is generated.

In some embodiments, the third virtual item is regulated according to the features of the material object to generate the fourth virtual item; or the third virtual item is regulated according to the regulation operation of the third virtual item to generate the fourth virtual item.

The first terminal may automatically regulate the third virtual item based on the feature(s) of the material object until the fourth virtual item has greater similarity to the material object is generated, and through an automatic regulation way, the operation of the user may be saved. The user may also regulate the third virtual item on the first terminal and regulate the third virtual item to be in a form more similar to the material object, so that a virtual item more meeting the demand of the user is generated. By providing the automatic regulation way and a manual regulation way of the user, the flexibility is improved.

In some embodiments, the first user may further set a numerical value (price) for the virtual item customized by the first user and complete payment. Accordingly, an input window for inputting a numerical value of the virtual item is displayed; a payment window is displayed after the numerical value input to the input window is acquired, where the payment window is configured to pay the numerical value; and the virtual item is displayed on the live broadcast interface when payment is detected to be completed.

Prompt information and an input box may be displayed in the input window. The prompt information is configured to prompt the user to input the numerical value of the virtual item customized by the user. The user may input a certain numerical value to the input box after seeing the prompt information. The user may be prompted to perform payment in the payment window. The payment window may also provide various payment ways to be selected by the user. After selecting a certain payment way, the user may complete payment through a third-party payment platform corresponding to the payment way, and the numerical value paid by the first user may be transferred to an account of the anchor user.

The numerical value of the virtual item is set and paid by the first user, so that the flexibility of paying the virtual item is improved; and the first user may voluntarily set the numerical value of the virtual item, so that the positivity that the audience user presents the virtual item may be increased.

In some embodiments, an information input window is displayed, where the information input window is configured to input descriptive information of the virtual item described by the first user; and the descriptive information, input to the information input window, of the virtual item is acquired.

In order to ensure that the second user knows the intention that the first user wants to express according to the virtual item customized by the first user, the first user may also provide the descriptive information of the virtual item customized by the first user. The first terminal may acquire the descriptive information input by the first user through the information input window, and the descriptive information input by the first user is used as the descriptive information of the virtual item customized by the first user. The audience user provides the descriptive information of the virtual item when customizing the virtual item, so that the descriptive information of the virtual item may be provided while the virtual item is presented to the anchor user. In this way, the anchor user may know the intention that the audience user wants to express.

In S35, the first terminal transmits a request for presenting the virtual item to a server.

In some embodiments, the first terminal may transmit the request for presenting a customized virtual item to the server after generating the virtual item, and the request is configured to request to present the virtual item to the second user. The first terminal may automatically transmit the request to the server after generating the customized virtual item and may also transmit the request to the server when receiving a presenting instruction. The presenting instruction may be triggered by a user operation. In some embodiments, if the first user determines to present the virtual item to the second user, the presentation operation may be performed for the virtual item. In some embodiments, a presenting button is clicked to trigger the presenting instruction for the virtual item.

The virtual item may be carried in the request for presenting the virtual item. The first terminal may acquire the descriptive information of the virtual item. The first terminal may also transmit the descriptive information to the server when transmitting the request for presenting the virtual item to the server. The descriptive information may be carried in the request for presenting the virtual item to be transmitted to the server, and may also be transmitted in a single message to the server together with the request.

In S36, when the request for presenting the virtual item is received, the server transmits information for displaying the virtual item to terminal(s) where respective user(s) in the live broadcast room of the second user is/are located according to the request for presenting the virtual item.

In some embodiments, it may be known that the first user wants to present the virtual item to the second user when the server receives the request for presenting the virtual item transmitted by the first terminal. In order to ensure that the user(s) in the live broadcast room may see the virtual item customized by the first user, the server may transmit the information for displaying the virtual item to the terminal(s). The terminal(s) are used by user(s) in the live broadcast room. In this way, all the users in the live broadcast room may see the virtual item customized by the first user.

Figure 4:
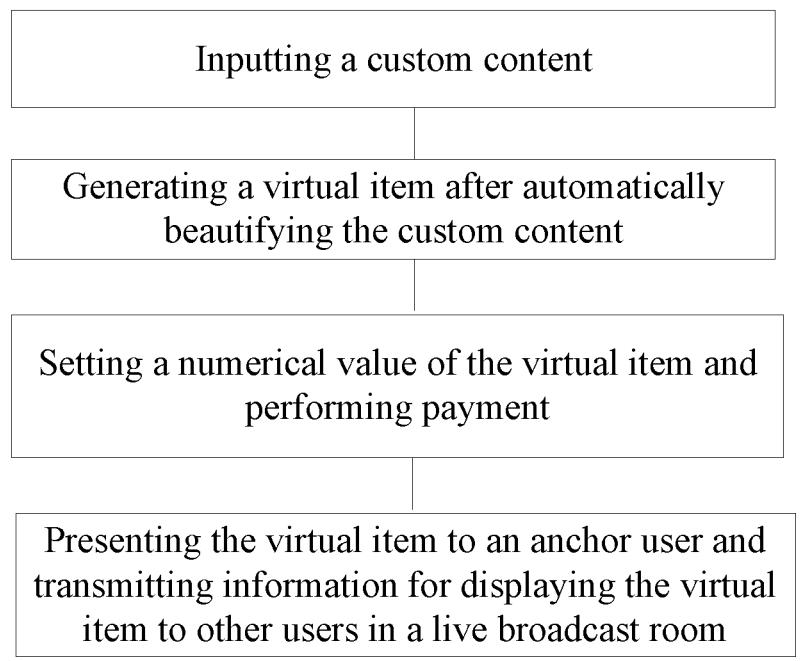
FIG. 4 is a flow diagram of a method for displaying a virtual item shown according to an exemplary embodiment.

Referring to FIG. 4 which is a flow diagram of a method for displaying a virtual item, as shown in FIG. 4, the audience user may input the custom content (user graffiti). The custom content may generate the virtual item (gift) after being automatically beautified by the terminal. The audience user may set the numerical value (price) of the virtual item and perform payment. The server may present the virtual item to the anchor user and transmit the information for displaying the virtual item to other users in the live broadcast room, so that each user in the live broadcast room may see that the audience user presents the customized virtual item to the anchor user.

With specific to the operation that the first terminal transmits the descriptive information of the virtual item to the server while transmitting the request for presenting the virtual item to the server, the server may transmit the descriptive information of the virtual item while transmitting the information for displaying the virtual item.

In S37, the first terminal displays the virtual item on the live broadcast interface when receiving the information for displaying the virtual item.

In some embodiments, the information for displaying the virtual item is configured to display the virtual item presented to the second user by the first user, the virtual item is generated based on the custom content of the first user. When receiving the information for displaying the virtual item, the first terminal may display the virtual item customized by the first user in a live video playing area of the live broadcast interface or display the virtual item in an area except the live video playing area. In some embodiments, the first terminal displays the virtual item in a public interaction area.

It should be noted that the above-mentioned S35 to S37 construct one possible implementation way that the first terminal displays the virtual item on the live broadcast interface. The audience user present the virtual item customized by the audience user to the anchor user, so that the virtual item customized by the audience user may better express the intention of the audience user, more abundant expression manners are provided for the audience user, and meanwhile, the interestingness of the live broadcast room is increased.

In some embodiments, the server transmits the descriptive information of the virtual item while transmitting the information for displaying the virtual item, the first terminal may display the descriptive information of the virtual item while displaying the virtual item on the live broadcast interface.

In S38, the second terminal displays the virtual item on the live broadcast interface when receiving the information for displaying the virtual item.

Similar to that the first terminal displays the virtual item, when receiving the information for displaying the virtual item, the second terminal may display the virtual item in a live video playing area of the live broadcast interface or display the virtual item in an area except the live video playing area.

In some embodiments, similar to that the first terminal displays the descriptive information of the virtual item, the second terminal may receive the descriptive information of the virtual item described by the first user and display the descriptive information of the virtual item while displaying the virtual item on the live broadcast interface.

In some embodiments, the descriptive information of the virtual item may not be displayed by the second terminal, but is guessed by the second user. Accordingly, a target window is displayed while the virtual item is displayed on the live broadcast interface, where the target window is configured to input descriptive information of the virtual item described by the second user; and result information is displayed while the descriptive information input to the target window is acquired, where the result information is configured to indicate whether the input descriptive information is same as the descriptive information of the virtual item described by the first user.

After seeing the virtual item customized by the first user, the second user may also guess what the virtual item is and input the descriptive information of the virtual item described by the second user into the target window. The second terminal may compare the descriptive information input by the second user with the descriptive information input by the first user. If the descriptive information input by the second user and the descriptive information input by the first user are same, right result information guessed is displayed, otherwise, wrong result information guessed is displayed. Since the audience user customizes the virtual item, the anchor user may guess the intention that the audience user wants to express, in this way, the interaction about draw something in the live broadcast room is realized.

In some embodiments, scoring information for the first user is acquired, where the scoring information is configured to evaluate the ability of the first user to customize the virtual item; and the scoring information of the first user is transmitted to a server, where the server is configured to transmit the scoring information for the first user to terminal(s) where respective user(s) in the live broadcast room of the second user is located.

After seeing the virtual item customized by the first user, the second user may score the first user so as to evaluate the ability of the first user to customize the virtual item. The server may transmit the scoring information for the first user to each terminal. Accordingly, in some embodiments, the second terminal displays the scoring information for the first user on the live broadcast interface. Similarly, the first terminal may also display the scoring information for the first user on the live broadcast interface after receiving the scoring information for the first user. The ability of the first user to customize the virtual item is scored on the basis that the user customizes the virtual item, so that each user in the live broadcast room may see scoring information of other users, and the interaction of drawing ability competition in the live broadcast room may be realized.

In some embodiments, due to the display of the live broadcast interface of the second user, the first user may customize a virtual item intended to be presented to the second user on the terminal. The first user may send an instruction for customizing the virtual item. The first terminal displays a window when receiving the instruction. The first user can input custom content to the window. The first terminal generates the virtual item based on the custom content, and display the virtual item on the live broadcast interface. Due to the adoption of the above-mentioned technical solution, the audience user may customize the virtual item for the anchor user, the demand that the audience user customizes the virtual item may be met, more abundant expression manners are provided for the audience user, the virtual item customized by the audience user may be displayed on the live broadcast interface, and the display effect of the virtual item may be enriched.

Figure 5:
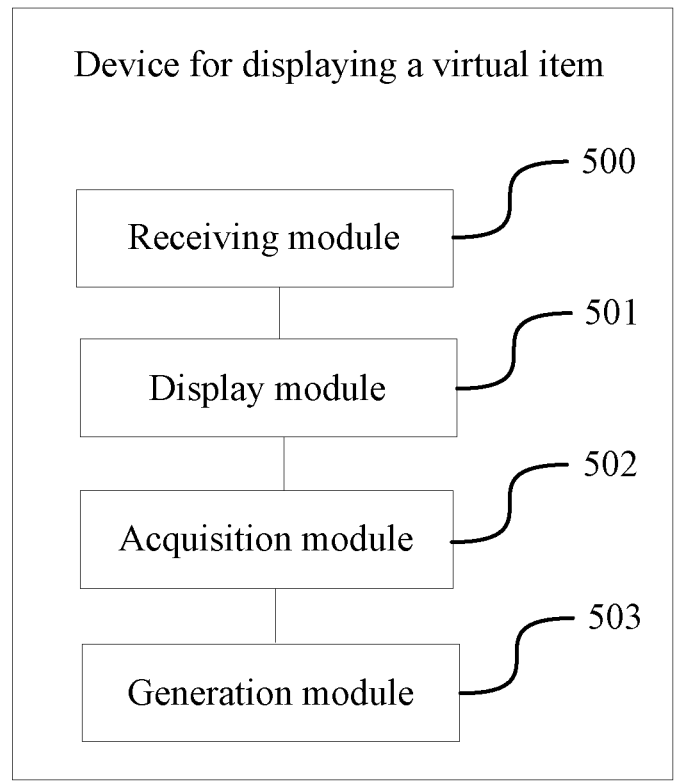
FIG. 5 is a block diagram of a device for displaying a virtual item shown according to an exemplary embodiment.

FIG. 5 is a block diagram of a device for displaying a virtual item shown according to an exemplary embodiment. Referring to FIG. 5, the device includes a receiving module 500, a display module 501, an acquisition module 502, and a generation module 503 and other modules for displaying a virtual item.

The receiving module 500 is configured to receive an instruction for customizing a virtual item.

The display module 501 is configured to display a window on the live broadcast interface in response to the instruction;

the acquisition module 502 is configured to acquire a custom content input to the window by the first user, wherein the custom content is configured to define a form of the virtual item;

the generation module 503 is configured to generate the virtual item based on the custom content; and the display module 501 is further configured to display the virtual item on the live broadcast interface.

In some embodiments, the custom content may be a text or graphics, and the generation module 503 is configured for:

taking the text or graphics as the virtual item; or beautifying the text or graphics to generate the virtual item.

In some embodiments, the custom content may be description of the virtual item, the description includes key information and non-key information, and the key information is configured to define an overall form of the virtual item, and the generation module 503 is configured for:

determining a first virtual item from a plurality of preset virtual items based on the key information; and regulating the first virtual item to generate a second virtual item.

In some embodiments, the generation module 503 is configured for:

regulating the first virtual item based on the non-key information to generate the second virtual item; or regulating the first virtual item in a regulation operation on the first virtual item to generate the second virtual item.

In some embodiments, the non-key information is configured to define a partial form of the virtual item, the generation module 503 is configured to regulate a part of the first virtual item based on the non-key information to generate the second virtual item, where a form of the part in the second virtual item conforms to the partial form defined by the non-key information.

In some embodiments, the custom content may be a picture obtained by shooting a material object, and the generation module 503 is configured for:

extracting features of the material object in the picture;

determining a third virtual item from a plurality of preset virtual items based on the features of the material object, wherein a similarity between the third virtual item and the material object is greater than a first similarity threshold; and regulating the third virtual item to generate a fourth virtual item, wherein a similarity between the fourth virtual item and the material object is greater than a second similarity threshold, and the second similarity threshold is greater than the first similarity threshold.

In some embodiments, the generation module 503 is configured for:

regulating the third virtual item based on the features of the material object to generate the fourth virtual item; or regulating the third virtual item in a regulation operation on the third virtual item to generate the fourth virtual item.

In some embodiments, the display module 501 is further configured for:

displaying an input window for inputting a numerical value of the virtual item;

displaying a payment window for paying the numerical value when acquiring the numerical value; and displaying the virtual item on the live broadcast interface based on that payment is completed.

In some embodiments, a transmitting module 504 (referring to FIG. 6) is included and is configured for:

transmitting a request for presenting the virtual item to a server, wherein the server is configured to transmit information for displaying the virtual item to terminals, wherein the terminals are used by users in a live broadcast room of the second user.

In some embodiments, the display module 501 is further configured to display an information input window, where the information input window is configured to acquire descriptive information of the virtual item, and the descriptive information is described by the first user.

Figure 6:
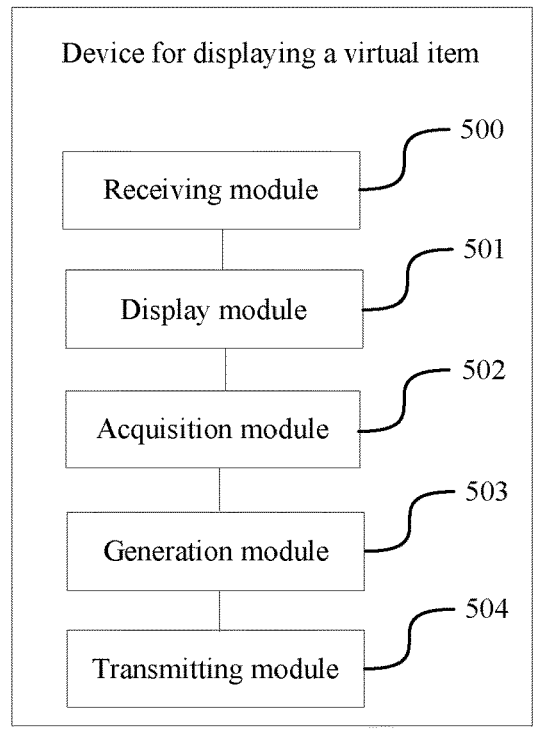
FIG. 6 is a block diagram of a device for displaying a virtual item shown according to an exemplary embodiment.

In some embodiments, referring to FIG. 6, the device further includes:

a transmitting module 504 configured to transmit the descriptive information to a server, wherein the server is configured to transmit the descriptive information to terminals, wherein the terminals are used by users in a live broadcast room of the second user.

In some embodiments, the display module 501 is further configured to display the descriptive information while displaying the virtual item on the live broadcast interface.

Figure 7:
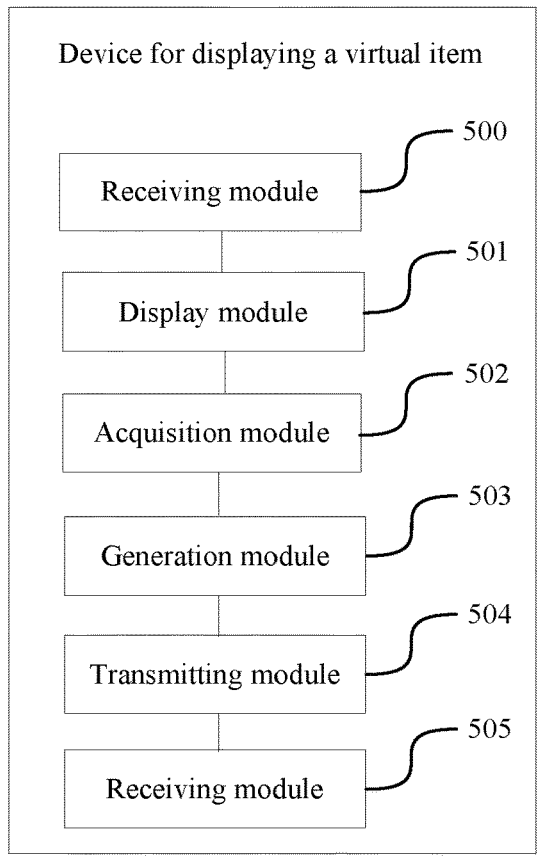
FIG. 7 is a block diagram of a device for displaying a virtual item shown according to an exemplary embodiment.

In some embodiments, referring to FIG. 7, the device further includes:

a receiving module 505 configured to receive scoring information, where the scoring information is configured to evaluate the ability of the first user to customize the virtual item; and the display module 501 is further configured to display the scoring information on the live broadcast interface.

In some embodiments, due to the display of the live broadcast interface of the second user, the first user may customize a virtual item intended to be presented to the second user on the terminal. The first user may send an instruction for customizing the virtual item. The first terminal displays a window when receiving the instruction. The first user can input custom content to the window. The first terminal generates the virtual item based on the custom content, and display the virtual item on the live broadcast interface. Due to the adoption of the above-mentioned technical solution, an audience user may customize a virtual item for an anchor user, the demand that the audience user customizes the virtual item may be met, more abundant expression manners are provided for the audience user, the virtual item customized by the audience user may be displayed on the live broadcast interface, and the display effect of the virtual item may be enriched.

Figure 8:
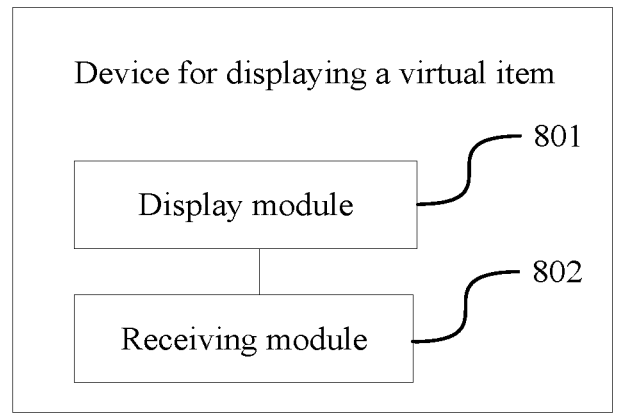
FIG. 8 is a block diagram of a device for displaying a virtual item shown according to an exemplary embodiment.

FIG. 8 is a block diagram of a device for displaying a virtual item shown according to an exemplary embodiment. Referring to FIG. 8, the device includes a display module 801 and a receiving module 802.

The display module 801 is configured to display a live broadcast interface on a second terminal;

the receiving module 802 is configured to receive information for displaying a virtual item, wherein the virtual item is presented to the second user by a first user, the virtual item is generated based on a custom content of the first user, and the custom content is configured to define a form of the virtual item; and the display module 801 is further configured to display the virtual item on the live broadcast interface.

In some embodiments, the receiving module 802 is further configured to receive descriptive information of the virtual item described by the first user; and the display module 801 is further configured to display the descriptive information while displaying the virtual item on the live broadcast interface.

In some embodiments, the display module 801 is further configured for:

displaying a target window while displaying the virtual item on the live broadcast interface, wherein the target window is configured to input descriptive information of the virtual item described by the second user; and displaying result information after acquiring the descriptive information input to the target window, wherein the result information is configured to indicate whether the input descriptive information is same as descriptive information of the virtual item described by the first user.

Figure 9:
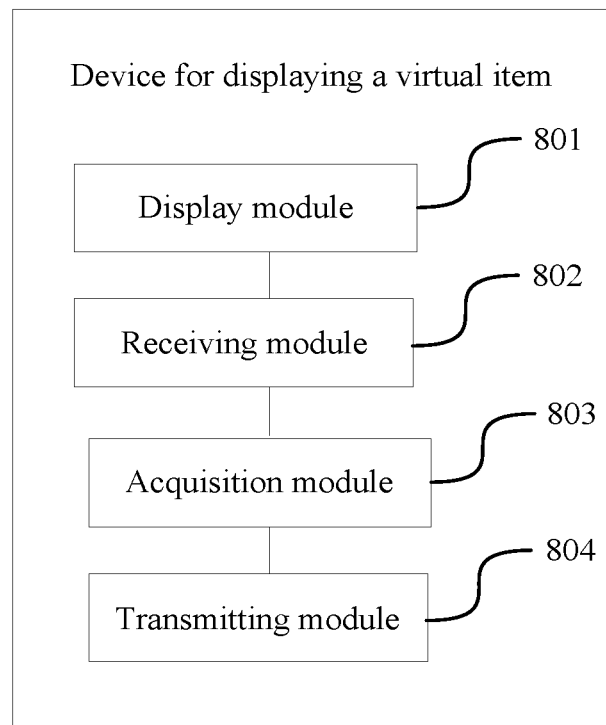
FIG. 9 is a block diagram of a device for displaying a virtual item shown according to an exemplary embodiment.

In some embodiments, referring to FIG. 9, the device further includes:

an acquisition module 803 configured to acquire scoring information, where the scoring information is configured to evaluate the ability of the first user to customize the virtual item; and a transmitting module 804 configured to transmit the scoring information to a server, where the server is configured to transmit the scoring information to terminals, and the terminals are used by users in a live broadcast room of the second user.

In some embodiments, the display module 801 is further configured to display the scoring information on the live broadcast interface.

In some embodiments, due to the display of the live broadcast interface of the second user, the a virtual item customized by the first user is displayed on the live broadcast interface when the virtual item display information is received. The virtual item is generated based on the custom content of the first user. Due to the adoption of the above-mentioned technical solution, an audience user may customize a virtual item for an anchor user, the demand that the audience user customizes the virtual item may be met, more abundant expression manners are provided for the audience user, the virtual item customized by the audience user may be displayed on the live broadcast interface, and the display effect of the virtual item may be enriched.

With regard to the devices in the above-mentioned embodiments, the specific way that each module executes the operation is described in detail in the embodiments related to the method, which is not illustrated in detail herein.

Figure 10:
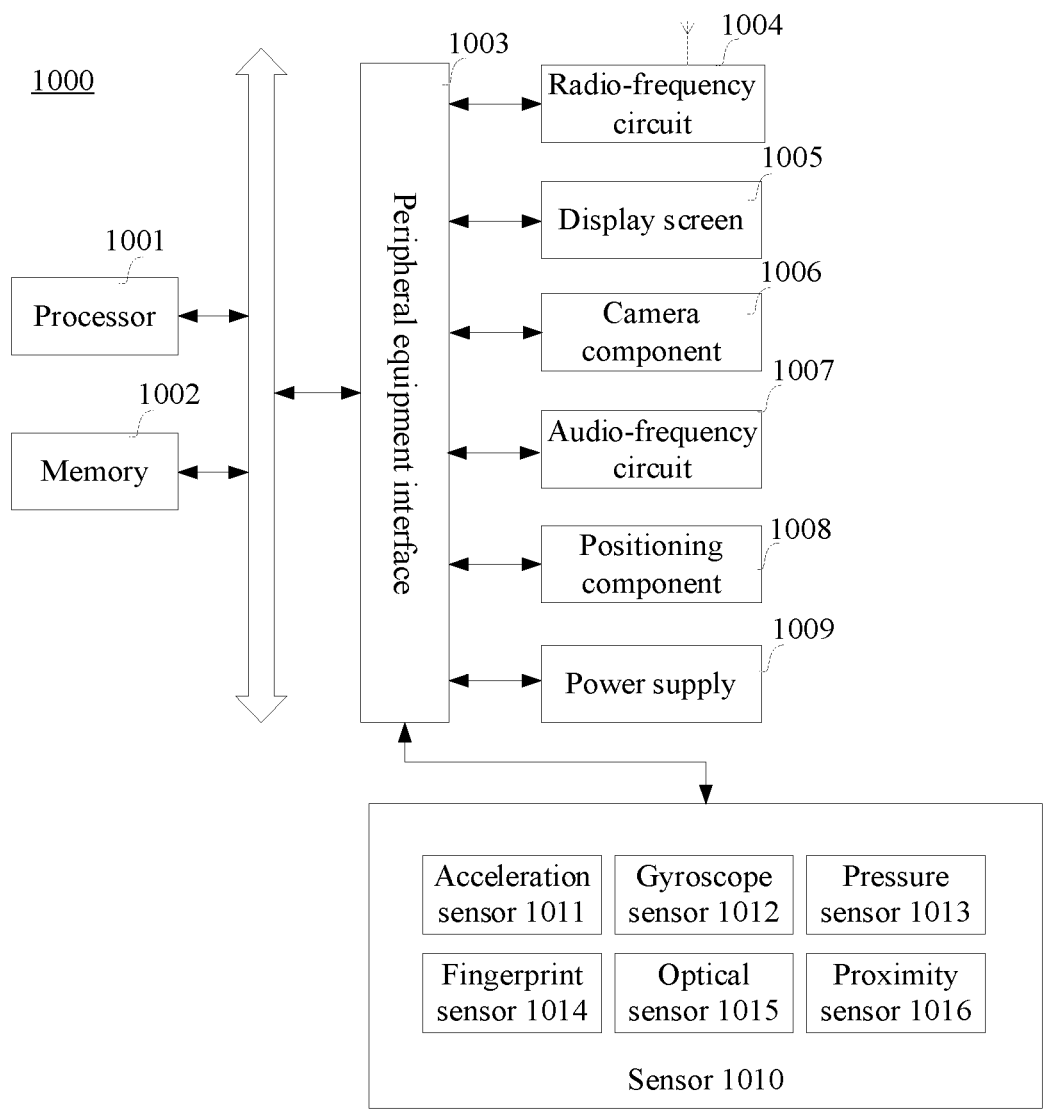
FIG. 10 is a block diagram of a terminal shown according to an exemplary embodiment.

FIG. 10 is a block diagram of a terminal 1000 shown according to an exemplary embodiment. The terminal 1000 may be a smart phone, a tablet personal computer, an MP3 (Moving Picture Experts Group Audio Layer III) player, an MP4 (Moving Picture Experts Group Audio Layer IV) player, a notebook computer or a desktop computer. The terminal 1000 may also be known as user equipment, a portable terminal, a laptop terminal, a desktop terminal or other names.

Generally, the terminal 1000 includes a processor 1001 and a memory 1002.

The processor 1001 may include one or more processing cores such as a quad-core processor and an eight-core processor. The processor 1001 may be realized by adopting at least one hardware form of DSP (Digital Signal Processing), an FPGA (Field-Programmable Gate Array) and a PLA (Programmable Logic Array). The processor 1001 may further include a host processor and a co-processor, the host processor is a processor for processing data in an awake state and is also known as a CPU (Central Processing Unit); and the co-processor is a low-power-consumption processor for processing data in a standby state. In some embodiments, the processor 1001 may be integrated with GPU (Graphic Processing Unit), and the GPU is configured to take charge of rendering and drawing a content required to be displayed by a display screen. In some embodiments, the processor 1001 may further include an AI (Artificial Intelligence) processor which is configured to process calculation operation related to machine learning.

The memory 1002 may include one or more computer readable storage media which may be non-temporary. The memory 1002 may further include a high-speed random access memory and a nonvolatile memory such as one or more pieces of disk storage equipment and flash memory equipment. In some embodiments, a non-temporary computer readable storage medium in the memory 1002 is configured to store at least one instruction, and the at least one instruction is configured to be executed by the processor 1001 to implement the method for displaying a virtual item provided by the embodiment of the method in the present application.

In some embodiments, the terminal 1000 may optionally include a peripheral equipment interface 1003 and at least one piece of peripheral equipment. The processor 1001, the memory 1002 and the peripheral equipment interface 1003 may be connected through a bus or a signal line. Each piece of peripheral equipment may be connected with the peripheral equipment interface 1003 through a bus, a signal line or a circuit board. Specifically, the peripheral equipment includes at least one of a radio-frequency circuit 1004, a display screen 1005, a camera component 1006, an audio-frequency circuit 1007, a positioning component 1008 and a power supply 1009.

The peripheral equipment interface 1003 may be configured to connect at least one piece of peripheral equipment related to I/O (Input/Output) to the processor 1001 and the memory 1002. In some embodiments, the processor 1001, the memory 1002 and the peripheral equipment interface 1003 are integrated on a same chip or circuit board; and in some other embodiments, any one or two of the processor 1001, the memory 1002 and the peripheral equipment interface 1003 may be realized on a single chip or circuit board, which is not limited in the present embodiment.

The radio-frequency circuit 1004 is configured to receive and transmit an RF (Radio Frequency) signal which is also known as an electromagnetic signal. The radio-frequency circuit 1004 performs communication with a communication network and other communication equipment through the electromagnetic signal. The radio-frequency circuit 1004 converts an electric signal into an electromagnetic signal to be transmitted or converts a received electromagnetic signal into an electric signal. Optionally, the radio-frequency circuit 1004 includes an antenna system, an RF transceiver, one or more amplifiers, a tuner, an oscillator, a digital signal processor, a coding and decoding chipset, a user identity module card and the like. The radio-frequency circuit 1004 may perform communication with other terminals through at least one wireless communication protocol. The wireless communication protocol includes, but is not limited to a metropolitan area network, various generations of mobile communication networks (2G, 3G, 4G and 5G), a wireless local area network and/or a WiFi (Wireless Fidelity) network. In some embodiments, the radio-frequency circuit 1004 may further include an NFC (Near Field Communication) related circuit, which is not limited in the present application.

The display screen 1005 is configured to display a UI (User Interface). The UI may include a picture, a text, an icon, a video and any combinations thereof. When the display screen 1005 is a touch display screen, the display screen 1005 is further capable of acquiring a touch signal on a surface of the display screen 1005 or above the surface. The touch signal may be used as a control signal to be input to the processor 1001 so as to be processed. At the moment, the display screen 1005 may be further configured to provide a virtual button and/or a virtual keyboard also known as a soft button and/or a soft keyboard. In some embodiments, one display screen 1005 may be provided and arranged on a front panel of the terminal 1000; in some other embodiments, at least two display screens 1005 may be provided and respectively arranged on different surfaces of the terminal 1000 or designed to be folded; and in some another embodiments, the display screen 1005 may be a flexible display screen and is arranged on a bent surface or folded surface of the terminal 1000. Even, the display screen 1005 may be arranged to form a non-rectangular irregular figure, namely a special-shaped screen. The display screen 1005 may be made from an LCD (Liquid Crystal Display), an OLED (Organic Light-Emitting Diode) and the like.

The camera component 1006 is configured to acquire an image or a video. Optionally, the camera component 1006 includes a front camera and a rear camera. Generally, the front camera is arranged on the front panel of the terminal, and the rear camera is arranged on the back of the terminal. In some embodiments, at least two rear cameras are provided and are respectively any one of a main camera, a depth-of-field camera, a wide-angle camera and a telephoto camera, so that the main camera and the depth-of-field camera are integrated to realize a background delexicalization function, and the main camera and the wide-angle camera are integrated to realize panoramic shooting and VR (Virtual Reality) shooting functions or other integrated shooting functions. In some embodiments, the camera component 1006 may further include a flashlight. The flashlight may be a single-color-temperature flashlight or a double-color-temperature flashlight. The double-color-temperature flashlight refers to a combination of a warm-light flashlight and a clod-light flashlight and may be used for light compensation under different color temperatures.

The audio-frequency circuit 1007 may include a microphone and a loudspeaker. The microphone is configured to acquire sound waves of a user and an environment and convert the sound waves into electric signals which are input to the processor 1001 so as to be processed or are input to the radio-frequency circuit 1004 to realize voice communication. For a purpose of stereophonic sound acquisition or noise reduction, a plurality of microphones may be provided and respectively arranged on different parts of the terminal 1000. The microphone may also be an array microphone or an omnidirectional acquisition microphone. The loudspeaker is configured to convert the electric signals from the processor 1001 or the radio-frequency circuit 1004 into the sound waves. The loudspeaker may be a traditional thin film loudspeaker or a piezoceramic loudspeaker. When the loudspeaker is the piezoceramic loudspeaker, the electric signals may be not only converted into sound waves heard by human beings, but also converted into sound waves not heard by the human beings so as to be used for ranging. In some embodiments, the audio-frequency circuit 1007 may also include a headset jack.

The positioning component 1008 is configured to locate a current geographic position of the terminal 1000 so as to realize navigation or LBS (Location Based Service). The positioning component 1008 may be based on a GPS (Global Positioning System) of America, a BeiDou system of China, a Glonass system of Russia and a Galileo system of European Union.

The power supply 1009 is configured to supply power for each component in the terminal 1000. The power supply 1009 may be alternating current, direct current, a disposable battery or a rechargeable battery. When the power supply 1009 includes the rechargeable battery, the rechargeable battery may support wired charging or wireless charging. The rechargeable battery may be further configured to support a fast charging technology.

In some embodiments, the terminal 1000 further includes one or more sensors 1010. The one or more sensors 1010 include, but are not limited to an acceleration sensor 1011, a gyroscope sensor 1012, a pressure sensor 1013, a fingerprint sensor 1014, an optical sensor 1015 and a proximity sensor 1016.

The acceleration sensor 1011 may detect accelerations on three coordinate axes of a coordinate system established by the terminal 1000. In some embodiments, the acceleration sensor 1011 may be configured to detect components of a gravitational acceleration on the three coordinate axes. The processor 1001 may control the display screen 1005 to display a user interface with a horizontal view or a longitudinal view according to a gravitational acceleration signal acquired by the acceleration sensor 1011. The acceleration sensor 1011 may be further configured to acquire movement data of a game or a user.

The gyroscope sensor 1012 may detect a body direction and rotation angle of the terminal 1000 and may be cooperated with the acceleration sensor 1011 to acquire a 3D action of a user to the terminal 1000. The processor 1001 may realize following functions: action induction (for example, the UI is changed according to tilt operation of the user), image stabilization during shooting, game control and inertial navigation according to data acquired by the gyroscope sensor 1012.

The pressure sensor 1013 may be arranged on a side frame of the terminal 1000 and/or a lower layer of the display screen 1005. When the pressure sensor 1013 is arranged on the side frame of the terminal 1000, a holding signal of the user for the terminal 1000 may be detected, and the processor 1001 performs left/right hand recognition or fast operation according to the holding signal acquired by the pressure sensor 1013. When the pressure sensor 1013 is arranged on the lower layer of the display screen 1005, the processor 1001 controls an operable control on the UI according to the pressure operation of the user for the display screen 1005. The operable control includes at least one of a button control, a scroll bar control, an icon control and a menu control.

The fingerprint sensor 1014 is configured to acquire a fingerprint of a user, the processor 1001 recognizes the identity of the user according to the fingerprint acquired by the fingerprint sensor 1014, or the fingerprint sensor 1014 recognizes the identity of the user according to the acquired fingerprint. When the identity of the user is recognized to be a trusted identity, the processor 1001 authorizes the user to execute relevant sensitive operations including screen unlocking, encrypted information viewing, software downloading, payment, setting alteration and the like. The fingerprint sensor 1014 may be arranged on a front, back or side of the terminal 1000. When the terminal 1000 is provided with a physical button or a manufacturer logo, and the fingerprint sensor 1014 may be integrated with the physical button or the manufacturer logo.

The optical sensor 1015 is configured to acquire ambient light intensity. In one embodiment, the processor 1001 may control display brightness of the display screen 1005 according to the ambient light intensity acquired by the optical sensor 1015. Specifically, when the ambient light intensity is relatively high, the display brightness of the display screen 1005 is increased; and when the ambient light intensity is relatively low, the display brightness of the display screen 1005 is lowered. In another embodiment, the processor 1001 may further dynamically regulate shooting parameters of the camera component 1006 according to the ambient light intensity acquired by the optical sensor 1015.

The proximity sensor 1016 is also known as a range sensor and is generally arranged on the front panel of the terminal 1000. The proximity sensor 1016 is configured to acquire a distance from a user to the front of the terminal 1000. In one embodiment, when the proximity sensor 1016 detects that the distance from the user to the front of the terminal 1000 is gradually shortened, the processor 1001 controls the display screen 1005 to switch from an on-screen state to an off-screen state; and when the proximity sensor 1016 detects that the distance from the user to the front of the terminal 1000 is gradually increased, the processor 1001 controls the display screen 1005 to switch from the off-screen state to the on-screen state.

It can be understood by those skilled in the art that a structure as shown in FIG. 10 does not construct a limitation to the terminal 1000 and may include more or less components than the components shown in the figure, or be combined with some components or be arranged by adopting different components.

In some embodiments, a non-temporary computer readable storage medium is further provided, a terminal may execute a method for displaying a virtual item provided by the embodiment of each above-mentioned method when an instruction in the storage medium is executed by a processor of the terminal.

In some embodiments, the non-temporary computer readable storage medium may be an ROM (Read-Only Memory), an RAM (Random Access Memory), a CD-ROM (Compact Disc Read-Only Memory), a magnetic tape, a floppy disk, optical data storage equipment and the like.

In some embodiments, an application program product is further provided, when an instruction in the application program product is executed by a processor of a terminal, the terminal may execute a method for displaying a virtual item provided by the embodiment of each above-mentioned method.

Those skilled in the art will readily think of other implementation solutions of the present disclosure after considering the specification and putting the invention disclosed herein into practice. The present disclosure is intended to cover any modifications, applications or adaptive variations of the present disclosure, and the modifications, applications or adaptive variations conform to the general principle of the present disclosure and include common general knowledge or customary technical means in the technical field undisclosed in the present disclosure. The specification and the embodiments are merely regarded to be exemplary, and the true scope of the present disclosure are indicated in the following claims.

It should be understood that the present disclosure is not limited to the precise structures which are described as above and shown in the accompanying drawings, and various modifications and alterations may be made without departing from the scope of the present disclosure. The scope of the present disclosure is only limited by the appended claims.

What is claimed is:

1. A method for displaying a virtual item, comprising:
   receiving, by a first terminal, an instruction for customizing a virtual item from a first user, wherein the first user watches a live broadcast interface of a second user through the first terminal;
   displaying, by the first terminal, a window on the live broadcast interface in response to the instruction, wherein the window is configured to receive a custom content input by the first user;
   acquiring, by the first terminal, the custom content in response to that the window receives the custom content input by the first user, wherein the custom content is configured to define a form of the virtual item;

generating, by the first terminal, the virtual item based on the custom content; and displaying, by the first terminal, the virtual item on the live broadcast interface.

2. The method according to claim 1, wherein the custom content comprises a text or graphics, and said generating, by the first terminal, the virtual item comprises:

taking, by the first terminal, the text or graphics as the virtual item; or beautifying, by the first terminal, the text or graphics to generate the virtual item.

3. The method according to claim 1, wherein the custom content comprises description of the virtual item, the description comprises key information and non-key information, and the key information is configured to define an overall form of the virtual item, and said generating, by the first terminal, the virtual item comprises:

determining, by the first terminal, a first virtual item from a plurality of preset virtual items based on the key information; and generating, by the first terminal, a second virtual item by regulating the first virtual item.

4. The method according to claim 3, wherein said generating, by the first terminal, the second virtual item comprises:

generating, by the first terminal, the second virtual item by regulating the first virtual item based on the non-key information; or generating, by the first terminal, the second virtual item by regulating the first virtual item based on a regulation operation from the first user on the first virtual item.

5. The method according to claim 4, wherein the non-key information is configured to define a partial form of the virtual item, and said generating, by the first terminal, the second virtual item by regulating the first virtual item based on the non-key information comprises:

generating, by the first terminal, the second virtual item by regulating a part of the first virtual item based on the non-key information, wherein a form of the part in the second virtual item conforms to the partial form defined by the non-key information.

6. The method according to claim 1, wherein the custom content comprises a picture obtained by shooting a material object, and said generating, by the first terminal, the virtual item comprises:

extracting, by the first terminal, features of the material object in the picture;

determining, by the first terminal, a third virtual item from a plurality of preset virtual items based on the features of the material object, wherein a similarity between the third virtual item and the material object is greater than a first similarity threshold; and generating, by the first terminal, the fourth virtual item by regulating the third virtual item, wherein a similarity between the fourth virtual item and the material object is greater than a second similarity threshold, and the second similarity threshold is greater than the first similarity threshold.

7. The method according to claim 6, wherein said generating, by the first terminal, the fourth virtual item comprises:

generating, by the first terminal, the fourth virtual item by regulating the third virtual item based on the features of the material object; or generating, by the first terminal, the fourth virtual item by regulating the third virtual item in a regulation operation on the third virtual item.

8. The method according to claim 1, further comprising:

displaying, by the first terminal, an input window for inputting a numerical value of the virtual item;

displaying, by the first terminal, a payment window for paying the numerical value when acquiring the numerical value; and displaying, by the first terminal, the virtual item on the live broadcast interface based on that payment is completed.

9. The method according to claim 1, further comprising:

transmitting, by the first terminal, a request for presenting the virtual item to a server, wherein the server is configured to transmit information for displaying the virtual item to terminals, wherein the terminals are used by users in a live broadcast room of the second user.

10. The method according to claim 1, further comprising:

displaying, by the first terminal, an information input window, wherein the information input window is configured to acquire descriptive information of the virtual item, and the descriptive information is described by the first user.

11. The method according to claim 10, further comprising:

transmitting, by the first terminal, the descriptive information to a server, wherein the server is configured to transmit the descriptive information to terminals, wherein the terminals are used by users in a live broadcast room of the second user.

12. The method according to claim 10, further comprising:

displaying, by the first terminal, the descriptive information while displaying the virtual item on the live broadcast interface.

13. The method according to claim 1, further comprising:

receiving, by the first terminal, scoring information, wherein the scoring information is configured to evaluate ability of the first user to customize the virtual item; and displaying, by the first terminal, the scoring information on the live broadcast interface.

14. A method for displaying a virtual item, comprising:

displaying, by a second terminal, a live broadcast interface on the second terminal, wherein a second user performs live broadcast through the second terminal, and a first user watches a live broadcast interface of a second user through the first terminal;

receiving, by the second terminal, information for displaying a virtual item, wherein the virtual item is presented to the second user by a first user, the virtual item is generated based on a custom content input by the first user through a window on the live broadcast interface in a first terminal, and the custom content is configured to define a form of the virtual item; and displaying, by the second terminal, the virtual item on the live broadcast interface.

15. The method according to claim 14, wherein further comprising:

receiving, by the second terminal, descriptive information of the virtual item described by the first user; and displaying, by the second terminal, the descriptive information while displaying the virtual item on the live broadcast interface.

16. The method according to claim 14, further comprising:
    displaying, by the second terminal, a target window while displaying the virtual item on the live broadcast interface, wherein the target window is configured to input descriptive information of the virtual item described by the second user; and
    displaying, by the second terminal, result information after acquiring the descriptive information input to the target window, wherein the result information is configured to indicate whether the input descriptive information is same as descriptive information of the virtual item described by the first user.

17. The method according to claim 14, further comprising:
    acquiring, by the second terminal, scoring information, wherein the scoring information is configured to evaluate ability of the first user to customize the virtual item; and
    transmitting, by the second terminal, the scoring information to a server, wherein the server is configured to transmit the scoring information to terminals, and the terminals are used by users in a live broadcast room of the second user.

18. The method according to claim 17, further comprising:
    displaying, by the second terminal, the scoring information on the live broadcast interface.

19. A non-transitory computer readable storage medium storing at least one instruction executable by a processor of an electronic equipment, through which a first user watches a live broadcast interface of a second user, to:
    receive an instruction for customizing a virtual item;
    display a window on the live broadcast interface in response to the instruction, wherein the window is configured to receive a custom content input by the first user;
    acquire a custom content in response to that the window receives the custom content input by the first user, wherein the custom content is configured to define a form of the virtual item;
    generate the virtual item based on the custom content; and
    display the virtual item on the live broadcast interface.

* * * * *